Figures 1, 7:
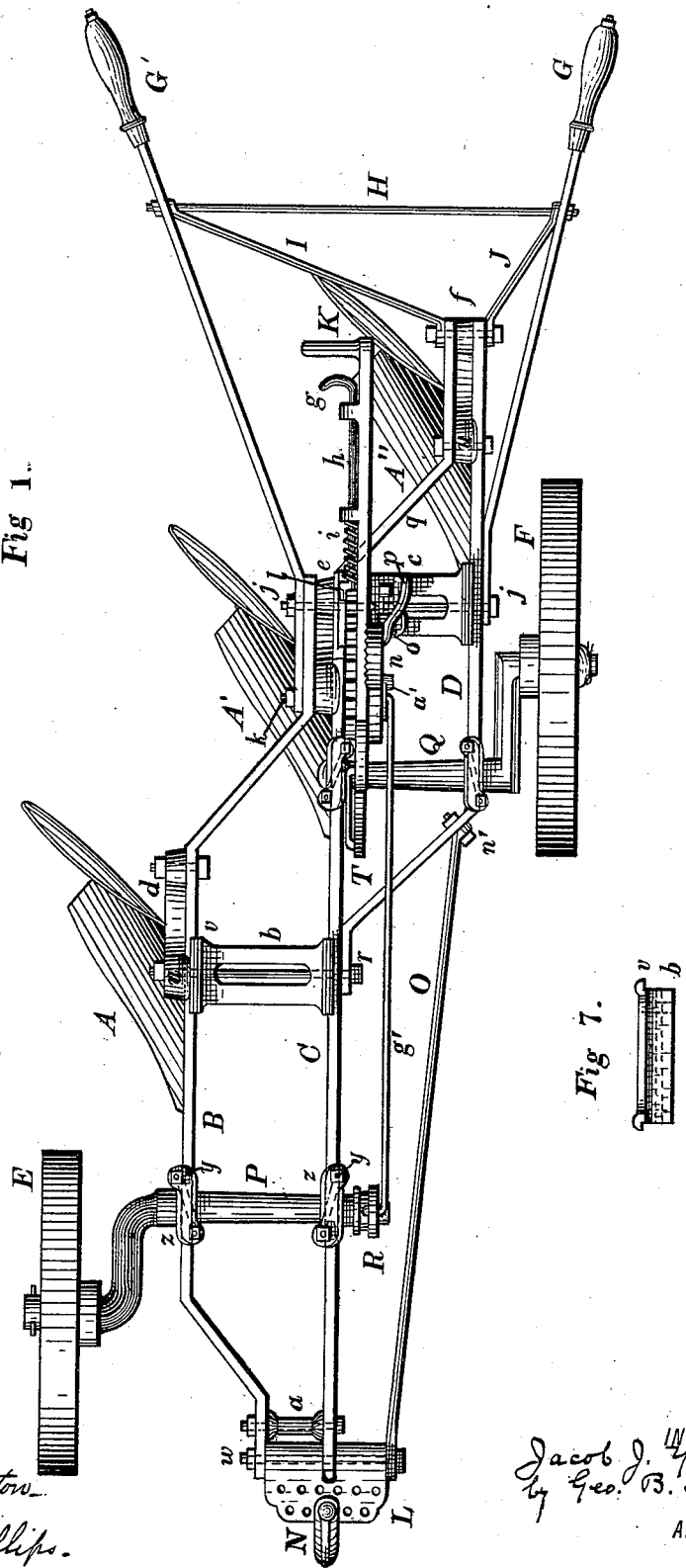

(No Model.) 2 Sheets—Sheet 1.
J. J. YOUNG.
GANG PLOW.

No. 337,107. Patented Mar. 2, 1886.

WITNESSES
D. Dunniston
H. G. Phillips

INVENTOR
Jacob J. Young,
by Geo. B. Selden,
Attorney

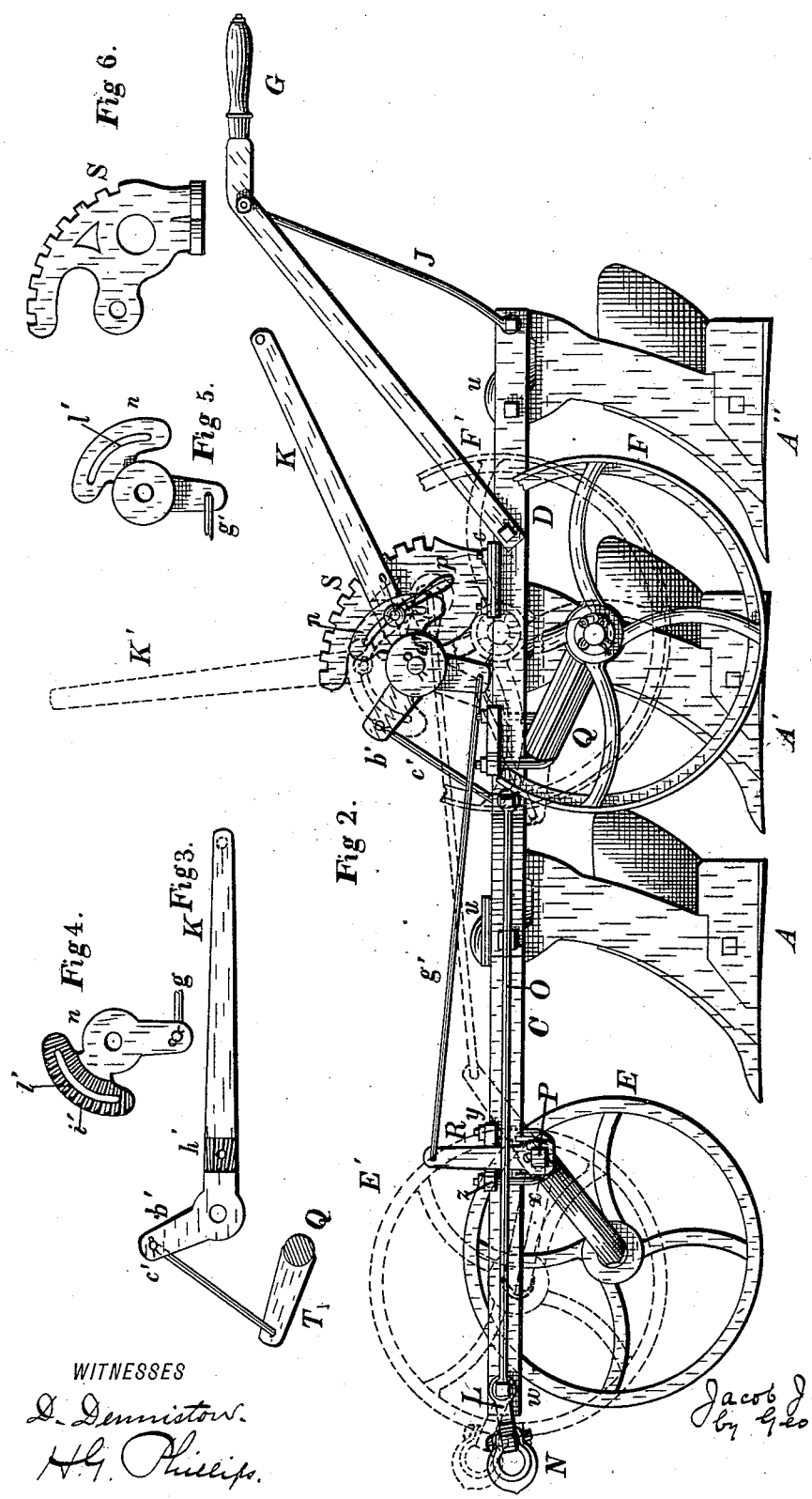

UNITED STATES PATENT OFFICE.

JACOB J. YOUNG, OF ROCHESTER, NEW YORK, ASSIGNOR, BY DIRECT AND MESNE ASSIGNMENTS, TO R. S. KENYON AND JOHN O. ROE, BOTH OF SAME PLACE.

GANG-PLOW.

SPECIFICATION forming part of Letters Patent No. 337,107, dated March 2, 1886.

Application filed November 12, 1885. Serial No. 182,636. (No model.)

*To all whom it may concern:*

Be it known that I, JACOB J. YOUNG, of Rochester, New York, have made certain Improvements in Gang-Plows, of which the following is a specification, reference being had to the accompanying drawings.

My invention relates to certain improvements in gang-plows, which improvements are fully described in the following specification, and the novel features thereof specified in the annexed claims.

The present invention has reference more particularly to improvement on the plow represented in the Letters Patent No. 177,078, granted to Richardson and McInnes, May 9, 1876. The improvements are intended to facilitate the adjustment of the two groundwheels with reference to each other and to the main frame, to adapt the frame for better withstanding the strains to which it is subjected, and to permit the draft to be applied at different points in relation to the main frame, as circumstances may require.

My improvements in gang-plows are represented in the accompanying drawings, in which—

Figure 1 is a plan view. Fig. 2 is a side elevation. Fig. 3 represents the lever detached. Figs. 4 and 5 are respectively views of the slotted adjusting-lever, as seen from opposite sides. Fig. 6 is a side elevation of the notched segment attached to the frame of the plow. Fig. 7 is a side view of one of the braces.

In the accompanying drawings, representing my improvements in gang-plows, A A' A" are the plows or shares, attached to a metallic frame consisting of three longitudinal bars, B C D, secured together by cross-bracing, forming a frame-work, which is supported on the wheels E F, by the adjustment of which the depth of the furrow is regulated.

G G' are the handles, which are secured to the sides of the frame-work, being supported from its rear end by suitable braces, H I J.

K is a hand-lever, by the adjustment of which, as indicated by the full and dotted lines in Fig. 2, the position of the wheels E F relatively to the plows, may be varied, so as to adjust the plow to any desired depth of furrow.

Provision is made for varying the relative position of the wheels with regard to each other by means of the adjusting-lever $n$ and clamp-screw $o$, provided with a nut and handle $p$, by means of which the relative position of the levers K and $n$ may be varied, thereby effecting a change in the relations of the wheels E and F to the plows.

The frame-work consists, essentially, of a central longitudinal bar, C, which is bent laterally near its rear end, as indicated at $q$. The side bar D is attached to the central bar, C, by the bolt $r$, and is bent outward and extended rearward, the standard of the plow A" being secured between the rear ends of the bars C and D by suitable bolts, as indicated at $f$ in Fig. 1. At the forward end of the plow the side bar B is attached to the central bar, C, by a bolt passing through the sleeve $a$, Fig. 1, and it is then bent outward and affords a point of attachment for the plow A by means of the bolts $r$ and $d$, being then bent inward and secured to the central bar by means of the bolts $k$ and $j$, the standard $e$ of the plow A' being interposed between the bars B and C at this point.

As indicated in the drawings, the standards of each of the plowshares are attached to the longitudinal bars of the frame-work by means of two bolts, the forward one of which passes through a lug, $u$, formed on the standard, and which has a lip projecting over the upper side of the bars of the frame-work, so as to resist the strain caused by the operation of the plows in the furrows. The forward ends of the handles G G' are attached to the sides of the bars B and D by means of the bolts $k$ and $j$, as represented in Fig. 1 of the drawings. $b$ and $c$ are respectively cross braces or struts interposed between the bars B and C and the bars C and D, for the purpose of strengthening the frame, the said struts being held in position by the bolts $r$ and $j$. The struts are provided with projecting lips $v$, which extend over the upper edges of the bars and serve to increase the rigidity of the frame-work. The brace O is attached to the side bar D at $n'$, Fig. 1.

At the forward end of the plow the clevis-block L is secured between the ends of the side bar B and the brace O, being pivoted on the bolt $w$, so that it may swing up and down, as indicated in the dotted lines in Fig. 2. A slot or recess is formed in the rear side of the clevis-block, which receives the forward end of the central bar, C. A series of holes are provided in the clevis-block, so that the clevis N may be shifted laterally to change the line of draft of the plow.

The wheel E is carried by the outer end of the bent axle P. The axle P is attached to the bars B and C by means of the yokes $x$, which are provided on their upper ends with a nut, $y$, and plate $z$, the arrangement being such that the axle is permitted to turn freely in the yoke, while lateral movement is prevented by shoulders or enlargements on the axle immediately outside of the bars B and C. It will be observed that the legs of the yokes $x$ are placed on opposite sides of the bars.

The wheel F is attached to the bars C and D by the bent axle Q in a manner similar to that already described with reference to the wheel E. The notched segment S is secured to the frame-work or the cross-brace $c$ in a suitable position in front of the handles, and serves to support the pivot $a'$, on which the lever K swings. The lever is provided with a sliding dog, $l$, arranged to slide through suitable lugs and to be engaged with the notches in the segment S by means of a coiled spring, $i$. The stem $h$ of the lug or catch $l$ extends upward and parallel to the lever. By the engagement of the catch $l$ in the notches of the segment S the lever is held in any desired position to which it may be adjusted. The bent end $b'$ of the lever K is connected by means of a link, $c'$, with the outer end of a lever, T, on the bent axle Q of the wheel F. The arrangement is such that the movement of the lever K upward, or toward the position indicated by the dotted lines K' in Fig. 2, raises the wheel upward from F to F' in said figure, thereby permitting the entrance of the plows into the ground. The same movement of the lever K is caused to shift the wheel E toward the position indicated by the dotted circles E', Fig. 2, by means of the adjusting-lever $n$, connection $g'$, and the lever R, which is attached to the end of the bent axle P, carrying wheel E. By this construction a simultaneous up-and-down movement of the wheels supporting the plow is secured. The adjusting-lever $n$ is arranged to be varied in angular position relative to the lever K by means of the screw $o$ and nut and handle $p$, so that the relative position of the wheels E and F may be altered.

As indicated at $h'$, Fig. 3, the lever K is provided with a series of radial ribs or projections, which engage with a corresponding series of ribs or projections, $i$, on the inner side of the adjusting-lever. The clamp-screw $o$ passes through a curved slot, $l'$, in the adjusting-lever. By releasing the clamp screw the position of the adjusting-lever $n$ relative to the lever K may be changed, thereby causing the wheel E to assume positions at a greater or less height relative to the frame-work of the plow, and thus adapting the machine to different depths of plowing.

My improved gang-plow is cheap and simple in construction, and exceedingly durable and efficient in practical use.

The main frame of my plow, as now constructed, differs from that represented in the original patent, No. 177,078, in having the bar B continued rearward and attached to the central bar, so as to dispense with the bar K of the original plow; also in having the brace O extended from the clevis to the bar D, which carries the standard of the rear plow, so that the propelling force is applied directly to the standard, instead of through the bent bars of the frame, whereby increased rigidity and steadiness of action are secured, and in having the clevis N extended beyond the land side of the bar C and connected to the brace O, so that the line of draft may be shifted toward the land a greater distance than in the original implement.

As regards the adjustable connections between the two wheels, the present plow differs from the original, among other things, in the use of the slotted lever $m$ and the adjusting-bolt in place of the perforated lever and rod therein.

I claim—

1. In a gang-plow, the combination of the plows A, A', and A'', the bars B, C, and D, clevis L, jointed to said bars and extended landward beyond the bar C, and the brace O, extending from the outer end of said clevis to the bar D, as described.

2. In combination with the frame of a gang-plow, the wheels E F, their crank-axles P Q, the hand-lever K and its locking devices, the link connecting said lever with an arm on the axle Q, the slotted lever $n$, the rod connecting said lever with an arm on the axle P, and the adjusting-bolt connecting the lever $n$ with the main lever K, as described.

3. In a gang-plow, and in combination with its main frame, the ground-wheels E and F, their cranked axles, each having an arm, the lever K, provided with serrations on its side face, the slotted lever $n$, also serrated, the bolt connecting the two levers, the rod $g'$, connecting the lever $n$ with the axle P, and the link $c'$, connecting the lever K with the axle Q.

JACOB J. YOUNG.

Witnesses:
CHARLES ROE,
GEO. B. SELDEN.